(12) United States Patent
Valecha et al.

(10) Patent No.: US 11,979,393 B2
(45) Date of Patent: *May 7, 2024

(54) CUSTOMIZABLE AUTHENTICATION SYSTEM

(71) Applicant: Green Market Square Limited, Road Town (VG)

(72) Inventors: Vinod A. Valecha, Pune (IN); Sanjay B. Panchal, Mumbai (IN); Mohit N. Agrawal, Pune (IN)

(73) Assignee: Green Market Square Limited (VG)

( * ) Notice: Subject to any disclaimer, the term of this patent is extended or adjusted under 35 U.S.C. 154(b) by 416 days.

This patent is subject to a terminal disclaimer.

(21) Appl. No.: 17/336,978

(22) Filed: Jun. 2, 2021

(65) Prior Publication Data

US 2021/0288953 A1  Sep. 16, 2021

Related U.S. Application Data

(63) Continuation of application No. 16/110,749, filed on Aug. 23, 2018, now Pat. No. 11,050,735.

(51) Int. Cl.
*H04L 9/40* (2022.01)
*H04L 9/32* (2006.01)

(52) U.S. Cl.
CPC .......... *H04L 63/083* (2013.01); *H04L 9/3226* (2013.01); *H04L 63/102* (2013.01)

(58) Field of Classification Search
CPC ....... H04L 9/3226; H04L 9/321; H04L 63/08; H04L 63/083; H04L 63/102; H04L 63/168
See application file for complete search history.

(56) References Cited

U.S. PATENT DOCUMENTS

| | | |
|---|---|---|
| 5,724,425 A | 3/1998 | Chang et al. |
| 7,788,730 B2 | 8/2010 | Dean et al. |
| 8,285,813 B1 | 10/2012 | Colton et al. |
| 8,341,714 B2 | 12/2012 | Muller et al. |
| 8,856,897 B2 | 10/2014 | Foley et al. |
| 8,918,834 B1 | 12/2014 | Samuelsson |
| 9,251,324 B2 | 2/2016 | Zhang et al. |
| 9,467,433 B2 | 10/2016 | Wifvesson et al. |
| 9,882,909 B2 | 1/2018 | Awan et al. |
| 10,013,493 B1 | 7/2018 | Gandhi |
| 10,356,088 B1* | 7/2019 | Peddada ............... H04L 9/3213 |
| 10,637,724 B2 | 4/2020 | Johnson et al. |
| 11,050,735 B2* | 6/2021 | Valecha ................. H04L 9/321 |
| 2010/0312704 A1 | 12/2010 | Rohatgi |
| 2010/0333079 A1 | 12/2010 | Sverdlov et al. |

(Continued)

OTHER PUBLICATIONS

Anonymous, Strengthening App Security with Multi-factor Authentication, Best Practices Brief, Centrify, 2016. [URL: https://www.centrify.com/resources/strengthening-app-security-with-multi-factor-authentication/].

(Continued)

*Primary Examiner* — Chau Le
(74) *Attorney, Agent, or Firm* — Van Pelt, Yi & James LLP

(57) ABSTRACT

An online authentication system allows a user to define their own logic for multistage authentication, which is provided to an online authentication center and stored as encrypted bytecode based on each user's password. Implementation logic can use third party information sources to provide additional authentication options.

14 Claims, 6 Drawing Sheets

(56) References Cited

U.S. PATENT DOCUMENTS

| | | |
|---|---|---|
| 2011/0087591 A1 | 4/2011 | Barnett et al. |
| 2012/0297371 A1 | 11/2012 | Greifeneder et al. |
| 2013/0019287 A1* | 1/2013 | Foley ............... H04L 63/205 726/4 |
| 2014/0223528 A1 | 8/2014 | Slutsker et al. |
| 2015/0161410 A1* | 6/2015 | Andersen ........... G06F 16/2291 713/165 |
| 2016/0125412 A1 | 5/2016 | Cannon |
| 2017/0102925 A1 | 4/2017 | Ali et al. |
| 2017/0286525 A1 | 10/2017 | Li et al. |
| 2018/0241728 A1* | 8/2018 | Burgess ............... H04L 9/3215 |
| 2019/0340284 A1 | 11/2019 | Kandukuri et al. |
| 2020/0067902 A1* | 2/2020 | Valecha ............... H04L 63/083 |
| 2020/0092285 A1 | 3/2020 | Graham et al. |

OTHER PUBLICATIONS

Anonymous, "Pluggable Authentication," MariaDB Knowledge Base. (n.d.) Retrieved from the Internet: URL: https://mariadb.com/kb/en/library/development-pluggable-authentication/ [retrieved on Aug. 23, 2018].

Anonymous, "Per-User Auth Plugin Requirements," OpenStack Docs, 2018. Retrieved from the Internet: URL: https://specs.openstack.org/openstack/keystone-specs/specs/keystone/ocata/per-user-auth-plugin-requirements [retrieved on Aug. 23, 2018].

U.S. Appl. No. 16/110,749, filed Aug. 23, 2018, 2020/0067902.

\* cited by examiner

CUSTOMIZABLE AUTHENTICATION SYSTEM

CROSS REFERENCE TO RELATED APPLICATIONS

This application is a continuation of U.S. patent application Ser. No. 16/110,749, now U.S. Pat. No. 11,050,735, filed on Aug. 23, 2018, the entire contents of which are hereby incorporated by reference herein.

BACKGROUND

Generally, in an authentication application or portal, an authentication algorithm is set by the application or by the portal operators. Users typically provide static credentials, such as username and password, to gain access. Portal operators can also enable multi-factor (multiphase) authentication, adding an additional phase to authentication. Typically, in the second phase a secret code is provided to a user who then repeats the code to the system to demonstrate that the user has access to the user's device, email system, or is somehow privy to the user's secret code. While the individual codes are different, generally, the same single or multiphase authentication process is applied to all users, as decided by the operators of the authentication portal. In some cases, user preferences can be applied to enable or disable multiphase authentication, or to bluntly select which of a few means can be used to deliver the code for the second phase, but the user has little or no control beyond these basic preferences.

The lack of extensibility in the authentication process leads to vulnerabilities. In single phase authentication, reliance on static password-based credentials means that if a password is compromised, an attacker can easily gain access to a system. Furthermore, if passwords are stored on a system, a hacker gaining access to the backend of an authentication system can learn the passwords for all users. Multifactor authentication systems can suffer from similar attacks. Because users often reuse passwords or use similar passwords across devices and systems, an attack that would defeat a simple password-based single factor authentication system has a reasonable likelihood of defeating a multifactor authentication system, as well. For example, if a hacker has stolen a user's password, it is likely that she can access other accounts of that user, making multifactor authentication much weaker.

SUMMARY

According to an embodiment of the present invention, a network-based authentication system, includes a server having a processor and a memory coupled to the server, configured to store user-customized logic at the direction of the server. The server is configured to perform steps of receiving user-customized logic for each of a plurality of users from the authentication system over a network, storing the user-customized logic for each user in the memory in an encrypted form based on a password of each user, and receiving the password of a user. The steps further include decrypting the user-customized logic for the user, receiving additional credentials from the user, verifying the additional credentials by executing the user-customized logic, and granting the user access to network resources responsive to the step of verifying.

In some embodiments, the server is further configured to compile the user-customized logic into bytecode prior to storing the logic as bytecode in the memory. In some embodiments, the step of receiving user-customized logic includes receiving the logic as bytecode from each user. In some embodiments, the server is further configured to provide an Application Programming Interface (API) to each user that facilitates user-creation of the user-customized logic. In some embodiments, the server is further configured to request information from a third-party service across the network as part of the step of verifying the additional credentials. In some embodiments, the third-party service is an SAP™ database or a Customer Relationship Management (CRM) database, such as Salesforce.

According to an embodiment of the present invention, a method for providing authentication services to a plurality of users includes steps of receiving, at a processor, user-customized logic from each of the plurality of users from a network, storing the user-customized logic for each user in a memory in an encrypted form based on a password of each user, and receiving, during an authentication process, the password of a user. The method further includes steps of decrypting the user-customized logic for the user, receiving additional credentials from the user, verifying, by the processor, the additional credentials by executing the user-customized logic, and sending an electronic message that grants the user access to network resources responsive to the step of verifying.

According to an embodiment of the present invention, that method is accomplished by a computer program product for authenticating any of a plurality of users, the computer program product comprising a computer readable storage medium having program instructions embodied therewith, wherein the computer readable storage medium is not a transitory signal per se, the program instructions executable by a computer processor to cause the processor to perform the method.

DETAILED DESCRIPTION OF THE EMBODIMENTS

Figure 1:
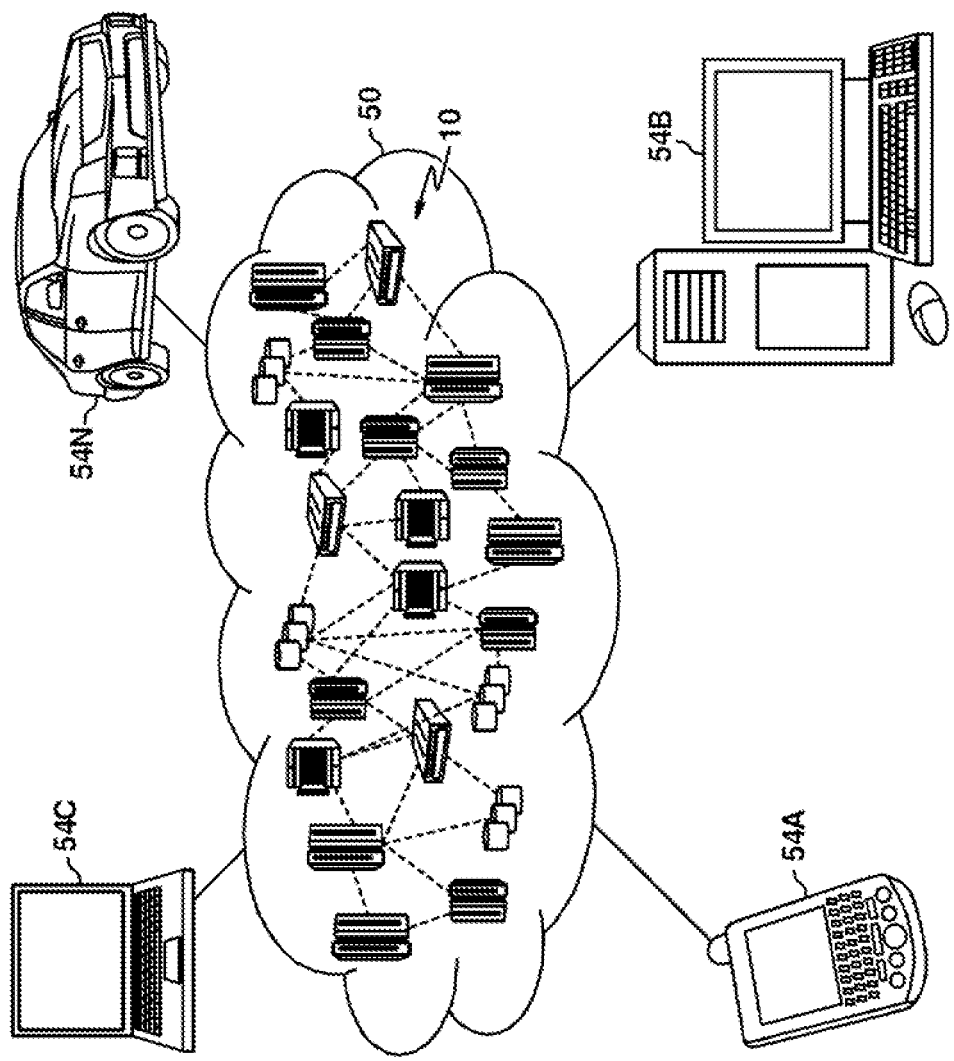
FIG. 1 depicts a cloud computing environment according to an embodiment of the present invention.

Authentication services can be provided by a server or cloud-based authentication portal that receives and stores customized implementation logic (bytecode) from each user at the time of registration of the user. The bytecode provided by the user is encrypted by the server using password-based encryption (PBE) that uses the user's password credentials to encrypt and store the logic on the online authentication portal. This customized bytecode then forms the implementation code for a user-defined, customized authentication process. After registration, during each authentication session, the user provides his user ID and password (or any other password-based credentials) and the server uses these credentials to unlock/decrypt the PBE memory containing the implementation logic. The server then executes it, implementing subsequent authentication steps. The user is asked to authenticate by providing custom credentials per the logic provided by the user at registration. The server executes the logic based on the user response and authenticates the user. This provides a flexible authentication framework beyond traditional multi-factor authentication, which typically uses the same implementation logic for each user. Because the implementation logic is customized by each user, a different customized authentication process can be used for each user. This process allows the authentication experience to go beyond mere password-based credentials or existing multi-factor authentication systems (which typically use the same multi-factor phase for each user, such as allowing each user to select the means by which to receive a code, the repetition of which will demonstrate that the user has access to another user account or device).

Implementation logic is stored as bytecode in encrypted form, based on a user's password, making the authentication system is less prone to attack. If an attacker gains access to the backend of the system, they only gain access to memory containing a series of secure memory spaces that require each user's password to unlock. If an attacker gains access to a user's password, they can only access the bytecode for execution that will then solicit responses to additional challenges (if accessing the backend). Because each user's logic is generally different, no single strategy can then be used to defeat the additional authentication step. Because bytecode is difficult to read outside the system that runs it, the information stored in the PBE memory, even if accessed by an attacker is not very useful. Furthermore, a front-end attack, such as using a user's password to mimic a user, will merely result in being solicited by a custom second phase of authentication. The strength of this second phase can vary by user based on the custom bytecode they provided at registration, but the specific process used in the second phase will be generally different for each user due to the custom implementation code. What might work to defeat the second phase of one user will generally not work for the next user, mitigating any impact of a system intrusion. Furthermore, because the user customizes the second phase, different users can have varying strengths of the second phase. A user with more privileges on a system can create a stronger second phase, while a user who has lower privileges or only accesses something like email, may choose a simpler second phase.

By utilizing PBE stored, custom logic for each user, the authentication system avoids storing static credentials that render many systems vulnerable. For example, biometric data, such as hashes of iris or fingerprint scans, can seem more secure than passwords, but can be quite vulnerable if an attacker gains access to stored information about biometrics on a server. Stored credentials can be vulnerable to brute force techniques. Even when the stored custom code of some embodiments uses a string or hash to compare to the user's credentials, the context of that stored data will not be clear from the contents of the PBE, making it difficult to use any stolen data. Each user can bring a different perspective to authentication, from personal information, real-time data, biometrics, etc. For example, the additional implementation logic created by a user can store a hash of data without any information about how it is generated. Conversely, the encrypted bytecode can include the logic for creating a hash of the user credentials that will be compared to a stored hash such that the hash is only created in real-time based on the user credentials, requiring that an attacker access, decrypt, and run the bytecode through the appropriate execution engine in order reach any stored user credentials.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
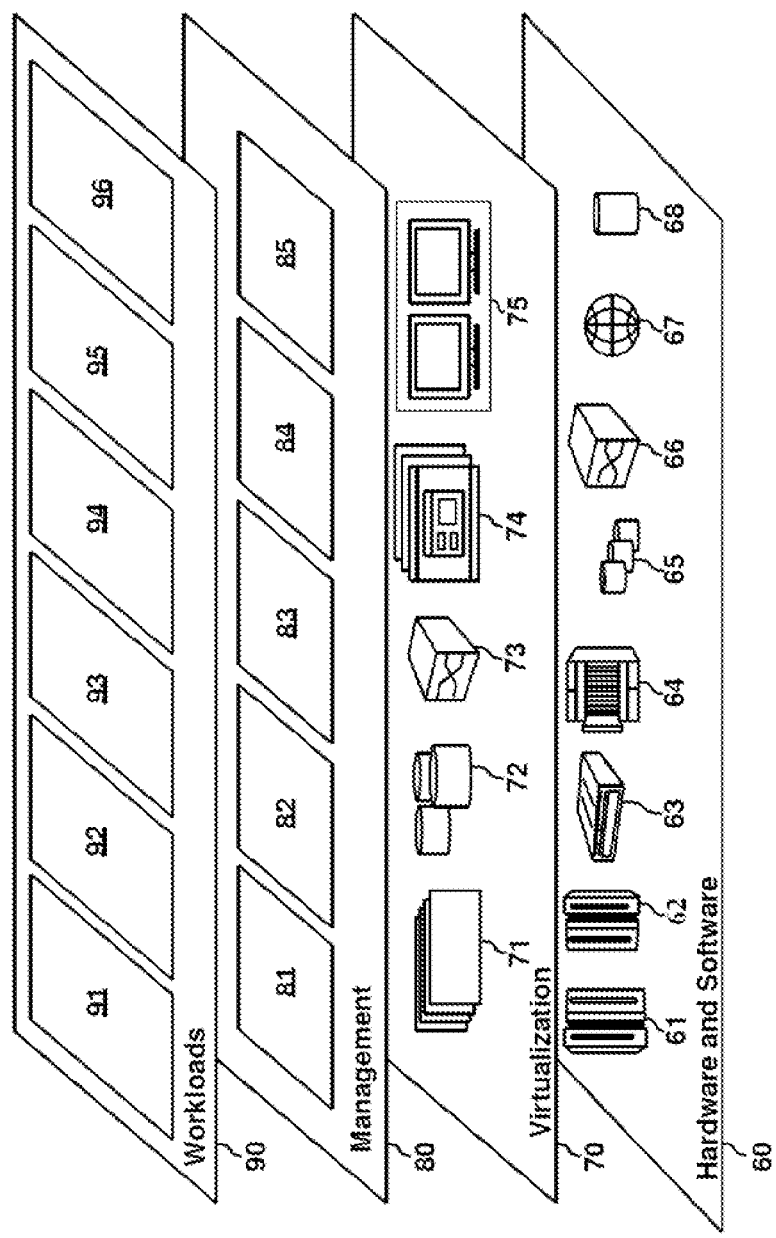
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user authentication 96. Exemplary embodiments on an authentication system that could utilize this cloud computing environment are described throughout this application. In some embodiments, exemplary authentication systems could operate at management level 80 or workload level 90.

Figure 3:
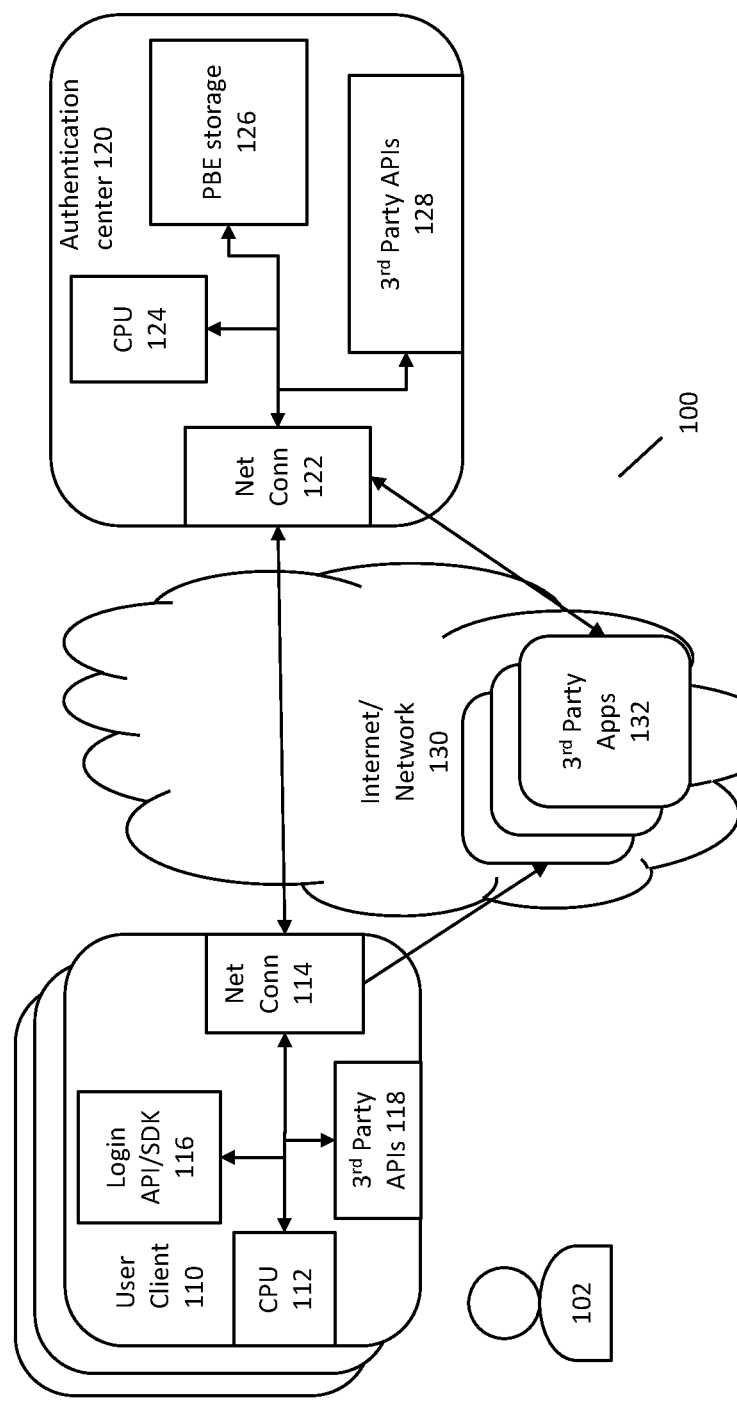
FIG. 3 depicts a system model of an exemplary authentication system according to an embodiment of the present invention.

A network-based authentication system for use with some embodiments is shown in FIG. 3. Authentication system 100 allows user 102 to customize the authentication experience and to later login using the customized implementation code she creates. To accomplish this, the user can use any suitable user client device 110. Client device 110 can be a PC/Mac-based computing system, phone, tablet, or any other suitable computing device coupled to the Internet. In some embodiments, client device 110 can be a server that user 102 accesses remotely or by proxy. User 102 can use the same or different client devices 110 to create the custom implementation code and to later authenticate with the system. Client device 110 is shown with components suitable for a client that can create the authentication implementation logic and later login to the system. Client device 110 includes a CPU 112 for controlling the device and coordinating the functions relating to implementation code creation and login, as well as any user interface or other features of the device unrelated to authentication. Client device 110 is a computer, including all relevant components such as memory, storage, internal buses, and any relevant peripheral components or software. Client device 110 also includes a network connection 114 for communicating with other devices on a network or across the Internet. This connection can be any suitable connection, including cellular, Wi-Fi, Ethernet, etc.

In some embodiments, user 102 creates the implementation code using an API or a Software Development Kit (SDK) 116 provided by the authentication system to facilitate creation of code in compliance with design rules for the system or code including modules provided by the system. In some embodiments, API/SDK 116 is downloaded or remotely accessed by the client during the implementation code creation process (e.g., it may not be entirely resident in client memory and could be accessed remotely via an online portal through client 110). In some embodiments, API/SDK 116 facilitates creating code using java, JavaScript, or any other suitable programming language as selected by system 100. In some embodiments, API/SDK 116 facilitates turning that code into compiled bytecode. In other embodiments, the bytecode compiling step occurs at the server after the user uploads code created using API/SDK 116, allowing the authentication system to target current hardware and plug any security holes found in the logic.

In some embodiments, client device 110 can include third party software or APIs 118 that allow the client to access third party applications or databases across the Internet. For example, client device 110 can include an application configured to access a CRM/Salesforce or SAP database, or similar corporate databases. These applications or databases can be protected through their own authentication process, such that only a qualified user 102 can access information contained therein. In some embodiments, the third party applications or APIs 118 can be replaced with a web browser, allowing user 102 to access web-based information sources, such as web portals for corporate databases, CRM resources, such as Salesforce or SAP, or for accessing social media information, such as Facebook, Twitter, Instagram, etc. Depending on the implementation logic the user wishes to create, third-party applications and APIs 118 can include any suitable means to access network-based information that will be used during the authentication process. In general, third-party applications and APIs 118 can include access to any suitable network-based resources that the server can also access in some form that could be useful to the implementation logic.

It should be appreciated that each client device 110 need not necessarily have all these components. For example, when only used to login (or when the API/SDK is web-based, accessed by client device 110 via a browser or similar application) or when the implementation code does not utilize thirty party apps as part of the custom authentication process (as defined by the user-created implementation code), the client device used by user 102 to access authentication system may not include all those components shown in client device 110.

Client device 110 interacts across network 130, which can include the Internet, with authentication center 120. Authentication center 120 can include one or more servers, and in some embodiments, can be cloud-based. Like client device 110, authentication center 120 is a computer that includes a CPU 124, network connection 122, and any other suitable components and software needed to perform as a computing system in accordance with embodiments. In addition to standard components of a server-based computing system, authentication center also includes a password-based encryption (PBE) memory storage device 126 for securely storing user-specific bytecode for each user of authentication system 100. This include a storage device, such as one or more hard drives, SSD, RAID, or any suitable cloud or network-based storage systems. PBE storage 126 can include one or more levels of encryption to protect the stored authentication implementation code for each user. This can include any device-level encryption that prevents accessing the contents of PBE storage should the entire storage device or authentication system 120 be breached physically or through network-based intrusion. Additionally, each user has a separate virtual memory space within PBE storage 126, each space being encrypted using each user's password-based credentials (e.g., username and password). This allows access to the user-specific bytecode stored within, only if CPU 124 is authenticated to authentication center 120 and if the user provides the proper username and password at the time of authentication. Then, CPU 124 can access the implantation bytecode provided by the user at the time of registration to enforce the user's custom authentication logic. Authentication center 120 can also include third party APIs 128 to allow CPU 124 to access network-based information through third party applications or databases.

Connected to network 130, third-party applications 132 can include CRM systems, social media sources, databases, or any other systems of information that may be useful in providing flexible information sources for the implementation logic of users. This allow many customization options for the logic for each user so that each user will generally have different implementation logic for authentication, increasing security of the implementation system. Exemplary third-party applications 132 can include any of those sources discussed throughout this application or any other source that is enabled by API/SDK 116 to be used in authentication implementation code.

Figure 4:
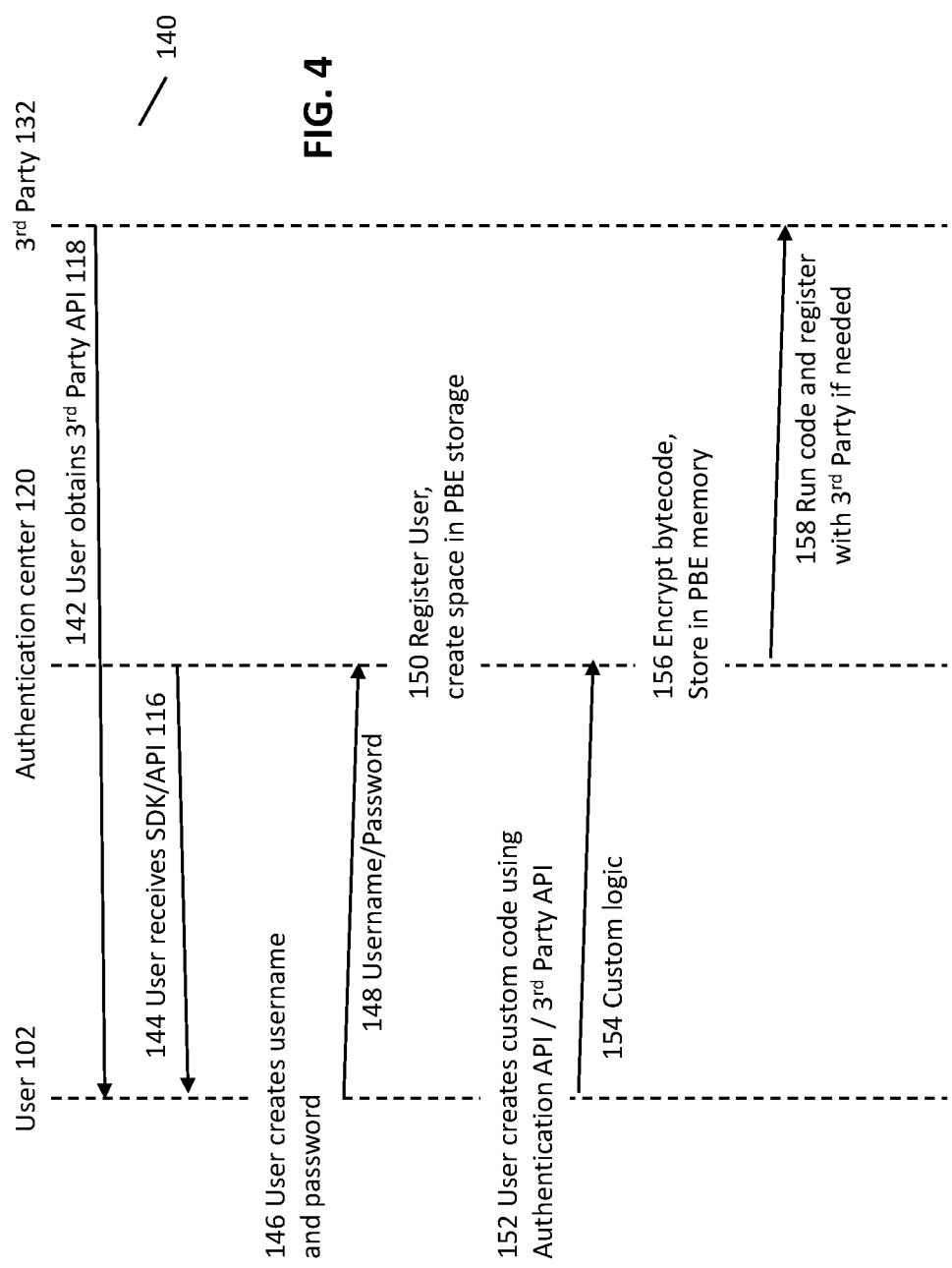
FIG. 4 depicts a flowchart of an exemplary registration process according to an embodiment of the present invention.

FIG. 4 is a flow chart of the interactions between user 102 (via client device 110), authentication center 120, and network-enabled third-party applications and services 132 during a user registration process 140. Not shown in FIG. 4 (or other flow charts) are extraneous acknowledgments, handshakes, connection setups, or other communications that occur commonly in network systems that do not help illustrate the concepts related to the features of embodiments. In some embodiments, the registration process can be performed without third party involvement. At step 142, if needed, a user registers with third-party services 132 obtains any APIs 118 or other information needed to create the custom authentication logic. For example, if the third-party service is an SAP system, the API/information may include credentials sufficient to allow to authentication center 120 to register and later access any information needed to execute the custom authentication logic. It should be noted that not all third-party services will require this step. At step 144, user 102 receives SDK/API 116 from the authentication center or from a website run by the provider of authentication services that facilitates the user-creation of custom authentication logic. This can include any information sufficient to assist the user in customizing her authentication process, including libraries, modules, a development environment, a creation wizard, etc. In some embodiments, this step can include accessing an online SDK and development environment or template hosted on a server, accessed via a web browser by user 102 and need not necessarily be limited to downloading the SDK to client device At step 146, user 102 creates a username and password. At step 148, the username and password are sent to authentication center 120. At step 150, authentication center 120 registers the user. This process can include additional interactions (not shown) with the user to create a new account or to update credentials for an existing user. At step 152, using SDK/API 116 and any third-party APIs or modules 118, user 102 creates the custom logic that will be executed by authentication center 120 during subsequent login attempts. Exemplary logic can be any logic compatible with SDK/API 116 as defined by the operator of authentication center 120. In some embodiments, this logic is compiled into bytecode by the user using client device 110, while in other embodiments the logic is prepared as a script, such as JavaScript, and presented to authentication center 120 for compiling at the server, allowing the authentication center 120 to ensure the bytecode is secure and does not contain malicious code. At step 154, user 102 sends the custom implementation logic in an appropriate form to authentication center 120 to register the logic to the user for later login.

At step 156, after receiving the implementation logic from user 102, authentication center 120 inspects, compiles (if needed), and otherwise prepares the implementation logic to be stored as encrypted bytecode in the PBE memory space assigned to that user. Authentication center 120 then encrypts and stores the bytecode using the user's password and username by any suitable encryption means. In some embodiments, as part of that inspection and storage process, authentication center 120 can register with third party services 132 to ensure that the system will be prepared to execute the implementation logic when the user attempts to login. At optional step 158, authentication center 120 executes a portion of the logic that dictates how to register authentication center 120 with third party services 132. This logic can be supplied by user 102 based on the information downloaded in step 142. This allows authentication system 120 to be viewed as a trusted party by third-party services 132, allowing authentication system 120 to be granted read access to certain (in some embodiments, limited) information for purposes of subsequently executing the user's custom implementation logic to verify the user's credentials using information from the third-party service.

Figure 5:
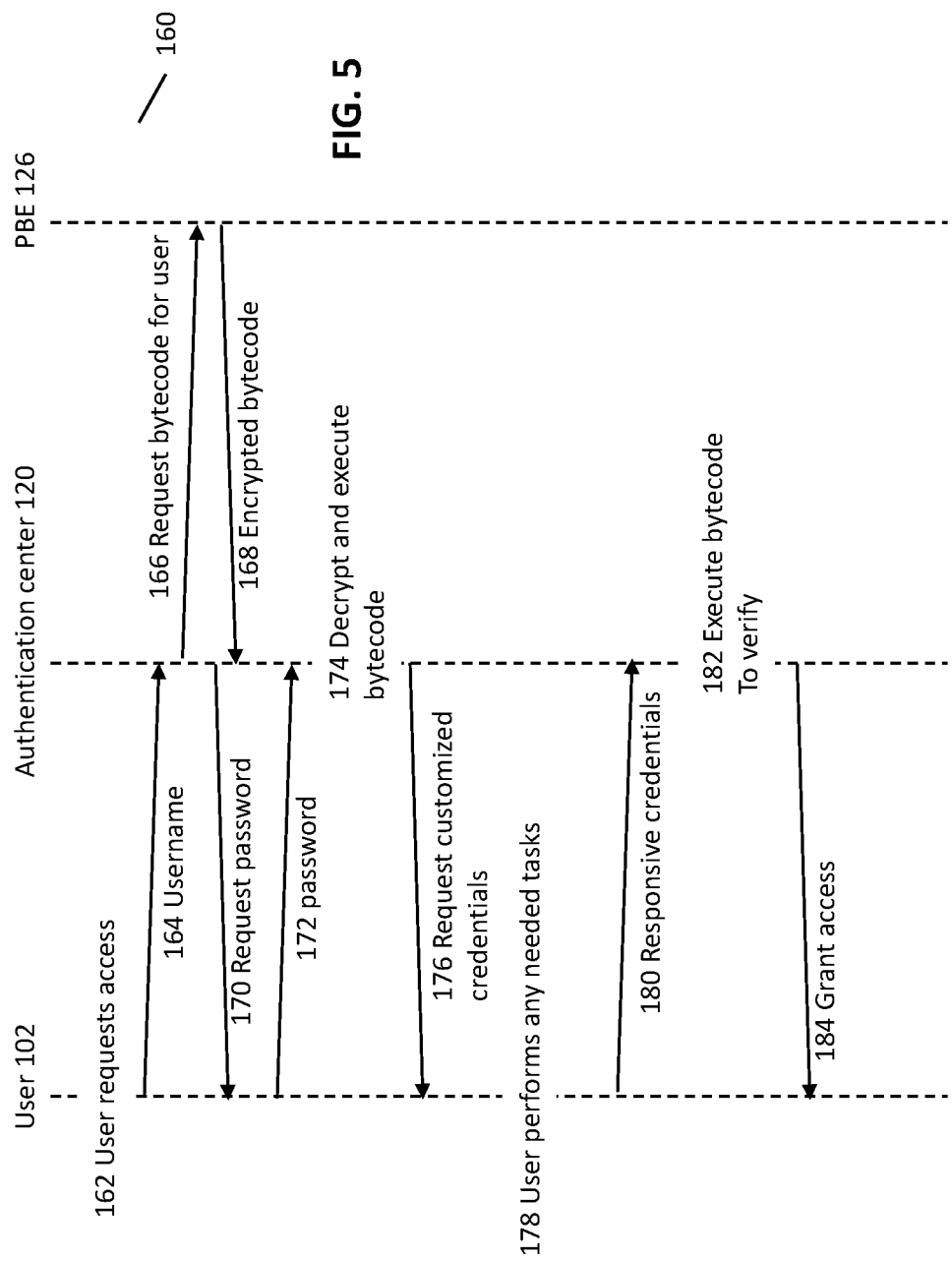
FIG. 5 depicts a flowchart of an exemplary authentication process according to an embodiment of the present invention.
Figure 6:
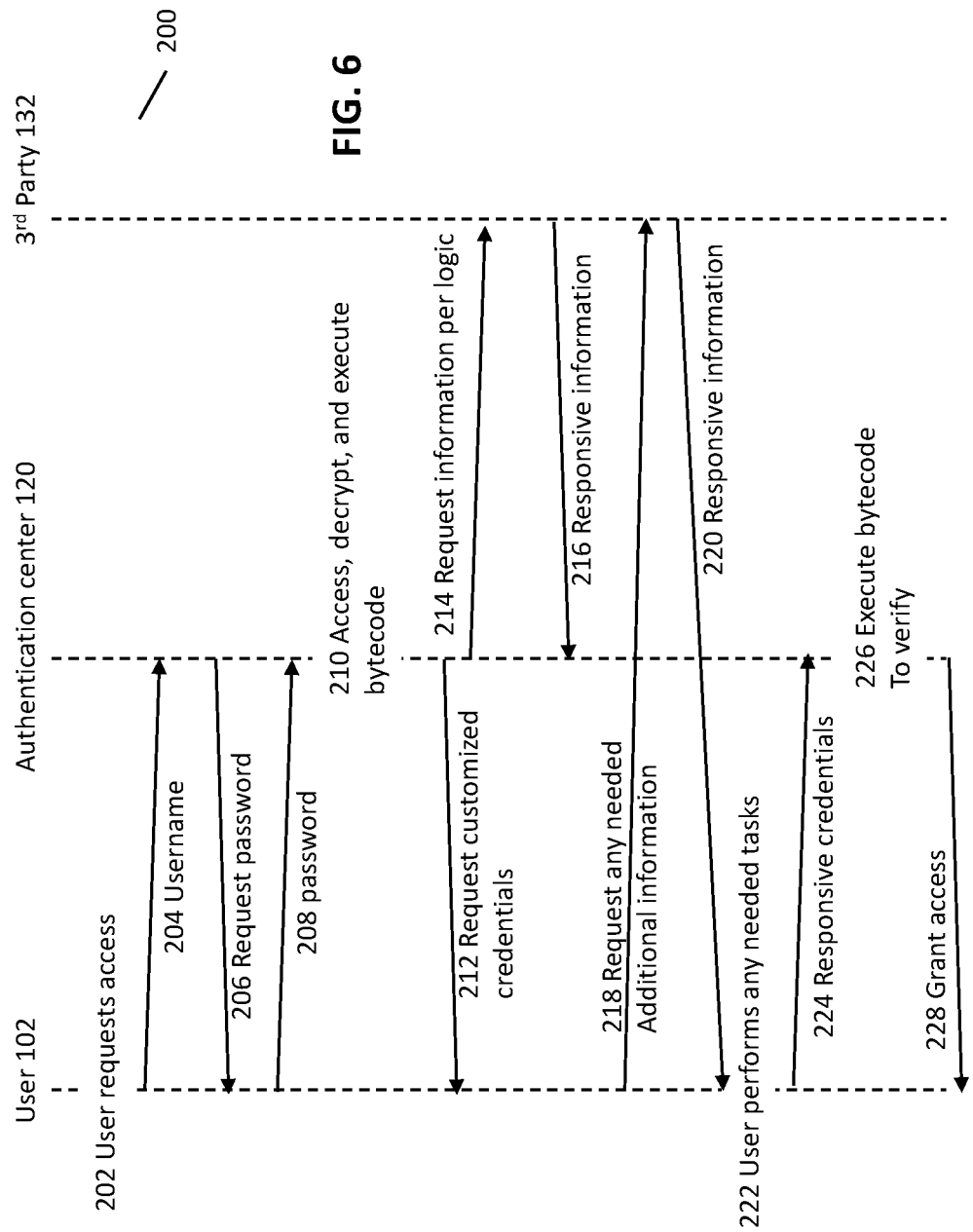
FIG. 6 depicts a flowchart of an exemplary authentication process according to an embodiment of the present invention.

FIG. 5 is a flow chart of an exemplary authentication process 160 for use with some embodiments. This authentication process does not specifically include interaction with third party services 132, but can easily be adapted to do so, as illustrated in FIG. 6. At step 162, user 102 requests access to a resource secured by the authentication system. The resource could be any network-based service or resource, such as access to a corporate database, network, application, or system. The authentication system could be a single sign-on system that grants credentials to a user for accessing multiple other services. This request can be through a website, an API, or a script presented by the authentication system via the service the user seeks access to. At step 164, the user presents her identity, such as a username or email address, to authentication center 120. FIG. 5 illustrates the interaction with PBE storage 126, which contains bytecode for each user's custom implementation logic. At step 166, authentication center 120 uses the username to request the user-specific bytecode from PBE storage 126. In some embodiments, this step includes presenting the user's password such that the decryption is performed by PBE storage device 126 itself (e.g., the decryption portion of step 174 is performed by PBE storage 126). In some embodiments, as part of step 166, authentication center 120 presents its own credentials to verify that the center itself is authorized to decrypt and access secured data. At step 168, PBE storage 126 returns the bytecode for the user (in encrypted form in this example). At step 170, authentication center 120 solicits the password from user 102, which will be used to decrypted the encrypted bytecode received from PBE storage 126. The user provides this password at step 172.

At step 174, authentication center 120 uses the password from the user to decrypt the bytecode for the user. The authentication center then executes the bytecode, allowing the user-defined logic to determine the specific steps that should be used for the next phase of authentication. In some embodiments, such as shown in FIG. 6, this step can include accessing other information sources (such as an SAP database) to retrieve the information used to verify the credentials solicited and received from the user in subsequent steps. At step 176, as defined by the user's custom implementation logic, authentication system 120 requests credentials or an action from user 102. For example, the logic may instruct the user to retrieve certain information in response to a challenge question or ask the user for an additional changing password defined by the logic.

At step 178, user 102 performs any tasks necessary to respond to the request, such as accessing third party resources (FIG. 6), performing calculations using information that only an authentic user would know, or by providing answers to user-defined challenge questions, created such that only the user would know the answer. These challenge questions are limited primarily by the user's creativity when defining the implementation logic. Once the user performs any needed tasks to formulate a response to the request, at step 180, the user provides the responsive credentials, such as an answer to the challenge question or a file created or obtained in response to the request in step 176.

At step 182, authentication center 120 executes the implementation logic/bytecode to determine if the user response is authentic. This can include any suitable logic, as chosen by the user, such as a direct comparison or (where security needs to be higher) by comparing a hash of the user response to a stored value that is a hash of the correct response, making it difficult to determine a proper user response even if the bytecode is compromised. At step 184, if the user response is satisfactory per the user's custom logic, authentication center 120 grants the user access. This can be done in any suitable manner, such as providing a token for the user to use at other online portals, sending a message to the online resources to grant access, etc.

FIG. 6 shows another embodiment of a method 200 for authenticating a user 120 that utilizes any of third-party services 132 to provide authentication information for use in the implementation logic. Generally, this process operates similarly to the process in FIG. 5, but the details of the interaction with PBE storage 126 are not shown.

At step 202, user 102 requests access to a resource secured by the authentication system, similar to step 162. At step 204, the user presents her identity, such as a username of email address, to authentication center 120. At step 206, authentication center 120 solicits the password from user 102, which will be used to decrypt the encrypted bytecode in PBE storage 126. At step 208, authentication center 120 receives the password from user 102.

At step 210, authentication center 120 accesses the encrypted bytecode for the user from the PBE storage and uses the password from the user to decrypt the bytecode. The authentication center then executes the bytecode, allowing the user-defined logic to determine the specific steps that should be used for the next phase of authentication. In this embodiment, this step includes accessing other information sources (such as an SAP database), as defined in exemplary the user-provided logic. Third party services can provide a variety of information to verify credentials provided by the user during the second stage of authentication. At step 212, as defined by the user's custom implementation logic, authentication system 120 requests credentials or an action by user 102. For example, the logic may instruct the user to retrieve certain information from a CRM or SAP database in response to a challenge question.

At step 214, authentication center 120 requests information (defined in the implementation logic) from third party service 132 to be used to verify the user's identity. At step 216, third party services 132 provide the responsive information. At step 218, user 102 requests related information from third-party services 132 in response to the request she received at step 212. This can be matching information to that sent in step 216 or related information that can be checked by the response in step 216. At step 220, if the user is authorized to access the information requested, third party services 132 provide responsive information.

At step 222, user 102 performs any tasks necessary to respond to the request, such as performing calculations using information from the third party, manipulating that information in a manner that only the user knows, or by providing answers to user-defined challenge questions created such that only the user would know the answer. The steps performed by the user at this step are limited primarily by the user's imagination at the time of defining the implementation logic. Once the user performs any needed tasks to formulate a response to the request, at step 224, the user provides the responsive credentials.

At step 226, authentication center 120 executes the implementation logic/bytecode to determine if the user response is authentic, per the logic defined by the user. This can include any suitable logic chosen by the user at registration, as explained with respect to step 182 in FIG. 5. At step 228, if the user response is satisfactory per the user's custom logic, authentication center 120 grants the user access.

Because embodiments of an authentication system use user-defined implementation logic to perform custom second-phase authentication of a user, examples of the authentication process can be virtually limitless. While a user could choose to implement logic that includes a second phase similar to that of current two-factor authentication systems, the underlying system differs due to the use of custom PBE-stored logic for each user. Thus, on a single authentication system many different authentication processes will exist for the various users. The following are a few simple illustrative examples of logic that a user can choose to implement.

Example 1: Each day of the week, the user has a different secondary password and after providing username and password, the user will be prompted for "today's secret word." For additional security, the bytecode can include a hash function and a table of expected outcomes so that the secret words of the day are not stored. Similarly, the hash or the secret word used by the user can be stored in a third-party database and the user can retrieve the word from a third party source.

Example 2: A challenge question is tied to information in an SAP database. A user in an accounting department can be asked customized questions, like "how many invoices were submitted yesterday?" Similarly, financial account information could be used ("when was your last deposit?") or a CRM database ("what is the zip code of client ABC?"). Logic for evaluating the user's response can even be more complex, such as "what is the sum of open invoices and invoices closed today?"

Example 3: A challenge question could relate to social media or public information, such as "what was the time of your latest tweet on Twitter?" or "how many likes does the company page currently have on Facebook?" Note that in many of these examples the logic can include any combination of available challenge questions and the logic randomly selects one to ensure that different authentication sessions will have different second-stage challenge responses. This can mitigate problems caused by unsecured connections where user responses are intercepted.

Example 4: The server uses a changing portion of information about user credentials, allowing a user to use more conventional credentials in the second phase. For example, "what are the last three digits of your phone number," "What is the sum of the last three digits of your zip code?" "What is the last digit of your phone number multiplied by the first digit of your social security number?"

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network-based authentication system, comprising:
   a server having a processor; and
   a memory coupled to the server, wherein the server is configured to perform steps of:
   receiving user-customized logic for a user of a plurality of users, wherein the user-customized logic is compiled using a user device;
   storing the user-customized logic for the user in the memory in an encrypted executable form based on a password of the user;
   receiving the password of the user;
   decrypting the user-customized logic using the password;
   receiving additional credentials from the user;
   verifying the additional credentials by executing the user-customized logic, and
   granting the user access to a network resources responsive to the step of verifying.

2. The network-based authentication system of claim 1, wherein the user-customized logic is received as bytecode.

3. The network-based authentication system of claim 1, wherein the server is further configured to provide an Application Programming Interface (API) to the user that facilitates user-creation of the user-customized logic.

4. The network-based authentication system of claim 1, wherein the server is further configured to request information from a third-party service across the network as part of the step of verifying the additional credentials.

5. A method for providing authentication services to a plurality of users, comprising steps of:
   receiving, at a processor, user-customized logic for a user of a plurality of users, wherein the user-customized logic is compiled using a user device;
   storing the user-customized logic for the user in a memory in an encrypted executable form based on a password of the user;
   receiving the password of a user, the user;
   decrypting the user-customized logic using the password;
   receiving additional credentials from the user;
   verifying the additional credentials by executing the user-customized logic; and
   granting the user access to a network resources responsive to the step of verifying.

6. The method of claim 5, wherein the user-customized logic is received as bytecode.

7. The method of claim 5, further comprising a step of providing an Application Programming Interface (API) to the user that facilitates user-creation of the user-customized logic.

8. The method of claim 5, further comprising a step of requesting, by the processor, information from a third-party service across the network, the information being used in the step of verifying the additional credentials.

9. The method of claim 8, wherein the third-party service is a Customer Relationship Management (CRM) database.

10. A computer program product for authenticating any of a plurality of users, the computer program product comprising a computer readable storage medium having program instructions embodied therewith, wherein the computer readable storage medium is not a transitory signal per se, the program instructions executable by a computer processor to cause the processor to perform a method comprising steps of:

receiving user-customized logic for a user of a plurality of users, wherein the user-customized logic is compiled using a user device;

storing the user-customized logic for the user in a memory in an encrypted executable form based on a password of the user;

receiving the password of the user;

decrypting the user-customized logic using the password;

receiving additional credentials from the user;

verifying the additional credentials by executing the user-customized logic; and granting the user access to a network resources responsive to the step of verifying.

11. The computer program product of claim 10, wherein the user-customized logic is received as bytecode.

12. The computer program product of claim 10, wherein the method further comprises a step of providing an Application Programming Interface (API) to the user that facilitates user-creation of the user-customized logic.

13. The computer program product of claim 10, wherein the method further comprises a step of requesting, by the processor, information from a third-party service across the network, the information being used in the step of verifying the additional credentials.

14. The computer program product of claim 13, wherein the third-party service is a Customer Relationship Management (CRM) database.

\* \* \* \* \*